United States Patent [19]
Yoshida et al.

[11] 3,875,259
[45] Apr. 1, 1975

[54] THERMOPLASTIC RESIN-GRAFT POLYBLEND COMPOSITIONS

[75] Inventors: Shuji Yoshida, Chiba; Tateo Iguchi, Ichihara, both of Japan

[73] Assignee: Denki Kagaku Kogyo Kabushiki Kaisha, Tokyo, Japan

[22] Filed: Mar. 12, 1974

[21] Appl. No.: 450,298

Related U.S. Application Data

[62] Division of Ser. No. 334,702.

[30] Foreign Application Priority Data
Feb. 26, 1972 Japan.............................. 47-20045

[52] U.S. Cl.............. 260/876 R, 260/881, 260/885
[51] Int. Cl......................... C08f 41/12, C08f 29/56
[58] Field of Search........................... 260/876, 881

[56] References Cited
UNITED STATES PATENTS
3,275,712  9/1966  Siebel et al. ........................ 260/876
3,691,260  9/1972  Mittnacht et al. ............... 260/876 R
3,691,261  9/1972  Cusano et al. ...................... 260/881

Primary Examiner—Murray Tillman
Assistant Examiner—C. J. Seccuro
Attorney, Agent, or Firm—Kemon, Palmer & Estabrook

[57] ABSTRACT

Thermoplastic resin compositions prepared by blending graftpolymers formed of rubbery copolymers obtained by copolymerizing a vinyl monomer with at least one compound selected from the group consisting of acrylic and methacrylic esters of tetrahydrofurfuryl alcohol, ethylene glycol monomethyl ether and 3-methoxybutanol, and at least one compound selected from the group consisting of aromatic vinyl compounds, vinyl cyanides, and mixtures of either of said types of compounds and monomers copolymerizable therewith, with polymers separately prepared from at least one compound consisting of either or combination of said aromatic vinyl compounds and vinyl cyanides.

6 Claims, No Drawings

THERMOPLASTIC RESIN-GRAFT POLYBLEND COMPOSITIONS

This is a division of application Ser. No. 334,702, filed Feb. 22, 1973 now U. S. Pat. No. 3,830,873.

This invention relates to thermoplastic resin compositions having prominent weatherability, high impact strength and good moldability.

In recent years, great demand has been made for thermoplastic resin compositions displaying prominent weatherability, high impact strength and satisfactory moldability even when they are used as electric or mechanical parts in a state exposed to severe environmental conditions. To date, however, there has not been developed any resin product which can fully meet the above-mentioned requirements.

There will now be described the studies which have hither to been made on thermoplastic resin compositions capable of presenting excellent weatherability, high impact strength and good moldability. For example, acrylonitrile-styrene copolymers (hereinafter referred to as "AS") and polystyrene (hereinafter referred to as "PS") which present a low impact strength, though these resins themselves have excellent properties, have been denatured for high impact strength into rubbery substances of conjugated diene series such as butadiene polymer or styrene-butadiene rubber (hereinafter referred to as "SBR") and accepted in wide fields under the name of ABS or HI-PS (high impact polystyrene). However, said ABS and HI-PS have an extremely low weatherability. This originates with the fact that butadiene series rubber itself has little weatherability and is readily subject to deterioration upon exposure to light. To eliminate such drawbacks, attempts have been made to incorporate a stabilizer, ultraviolet ray absorbent or a certain kind of pigment in the aforesaid ABS and HI-PS. Even these attemps have failed to enable the resins constituting said compositions to retain their original properties due to deterioration when the compositions are used long out of doors. To obtain prominent weatherability essentially, therefore, it has been proposed to replace the above-mentioned rubbers of conjugated diene series by other rubbers free from unsaturated bonds and displaying good weatherability by themselves, such as ethylene-propylene rubber (hereinafter referred to as "EPR"), ethylene-vinyl acetate copolymer rubber (hereinafter referred to as "EVA") or rubber of acrylic ester series (hereinafter referred to as "ACR").

However, EPR, EVA and ACR are little compatible with hard and brittle resins such as AS, PS and polymethyl methacrylate which are desired to have high impact strength. Therefore, EPR, EVA and ACR have to be graftpolymerized in advance with a suitable monomeric component which is essentially compatible with said hard brittle resins. In fact, however, EPR, EVA or ACR constituting a base polymer is already saturated, so that the molecules of said base polymer have very few active points for grafting with said monomeric component, obstructing sufficient grafting. Therefore, a graftpolymer of may be EPR, EVA and ACR with said monomeric component presents great difficulties in imparting high impact strength to the aforesaid brittle resins such as AS and PS due to the insufficient compatibility of any of EPR, EVA and ACR with the aforesaid monomeric component.

Attemps have been made to improve the activity of saturated rubbers such as EPR, EVA and ACR with respect to graftpolymerization. some of the attempts consist in, for example, growing peroxides in the molecules of a base polymer by oxidation before graftpolymerization is commenced, introducing a new polymerizable double bond group into the molecules of the base polymer or treating said base polymer with radiation. All these processes represent pretreatments preceding graftpolymerization and are intended to increase active points for graftpolymerization of the base polymer, largely affecting the physical properties of a final graftpolymerized product. Therefore, said process are subject to various limitations with respect to the environments and conditions in which said processes are carried out, and technically very much complicated. Moreover, these additional pretreatments eventually result in high production cost.

On the other hand, the Japanese Patent Publications Nos. 33193/70 1376/72 and 11826/72 set forth a method of first preparing a base polymer by copolymerizing acrylic esters of $C_1-C_8$ alcohols with cycloalkenyl esters and then producing a graftpolymer by radical polymerization of said base polymer with, for example, an aromatic vinyl monomer. However, none of the above-mentioned methods distinctly disclosed whether the product could display prominent weatherability and high impact strength. In addition, the Japanese Patent Publications Nos. 8987/70 and 17472/62 and U.S. Pat. No. 3,275,712 indicated description on the production of resin compositions having excellent weatherability and impact strength using methods similar to those shown in the first group of patents. The latter group of patents gave suggestions neither on the resolution of the previously mentioned drawbacks nor on any of the conventional processes of manufacturing resin compositions displaying such desired properties.

One of the prior art processes consisted in graftpolymerizing acrylonitrile and styrene with, for example polybutyl acrylate in the state of latex. The present inventors tested said process under various conditions. However, a resin composition obtained did not present high impact strength. This invention has been accomplished to eliminate the shortcomings of all the aforementioned proposed processes and is intended to provide thermoplastic resin compositions displaying excellent weatherability, impact strength and moldability. This invention comprises thermoplastic resin compositions prepared by the steps of copolymerizing 0.5 to 25 parts by weight of at least one compound selected from the groups consisting of acrylic and methacrylic esters of tetrahydrofulfuryl alcohol, ethylene glycol monomethyl ether and 3-methoxybutanol with 99.5 to 75 parts by weight of monomers consisting of alkyl acrylate wherein the alkyl group has 2 to 8 carbon atoms to obtain a rubbery copolymer A which is the same as the aforesaid base polymer; graftpolymerizing 100 parts by weight of said rubbery copolymer A with 100 to 300 parts by weight of at least one compound selected from the group consisting of aromatic vinyl compounds, vinyl cyanides and mixtures of either of said both types of compounds and monomers copolymerizable therewith in the presence of 0 to 0.5 parts by weight of a chain transfer reagent to obtain a graftpolymer B; and blending said graftpolymer B with a polymer C separately prepared from at least one compound consisting of either or combination of aromatic vinyl compounds and vinyl cyanides so as to cause said graftpolymer B to be uniformly dispersed in particle sizes of 150 to 1000 millimicrons in said polymer C. Thermoplastic resin compositions of this invention are prepared by effecting reactions in the following three steps.

Step I:

0.5 to 25 parts by weight by at least one compound selected from the group consisting of acrylic and methacrylic esters of tetrahydrofulfuryl alcohol (abbreviated as THF), ethylene glycol monomethyl ether (abbreviated as MOE) and 3-methoxy butanol (abbreviated as MOB) are copolymerized with 99.5 to 75 parts by weight of vinyl monomer consisting of alkyl acrylate wherein the alkyl group has 2 to 8 carbon atoms to obtain a rubbery copolymer A;

Step II:

100 parts by weight of said rubbery copolymer A are graftpolymerized with 100 to 300 parts by weight of at least one compound selected from the group consisting of aromatic vinyl compounds, vinyl cyanides and mixtures of either of said both types of compounds and monomers copolymerizable therewith in the presence of 0.5 part by weight or less alkyl mercaptan as a chain transfer reagent to obtain a graftpolymer B;

Step III:

Said graftpolymer B is uniformly dispersed in 150 to 1000 millimicron particles in a hard brittle polymer C separately obtained from at least one compound consisting of either or combination of aromatic vinyl compounds and vinyl cyanides.

Referring to Step I, the rubbery copolymer A readily admits of graftpolymerization without using any pretreatment required in the prior art and in consequence under the same conditions as in the ordinary grafting process applied in the manufacture of ABS resin. Said ordinary grafting process is set forth in the U.S. Pat. No. 3,168,593.

Said ordinary grafting process indeed enables the rubbery copolymer A obtained in Step I to be fully copolymerized with a compound which is compatible with PS and AS which are desired to have high impact strength, and causes the interfaces of the particles of the rubbery copolymer A to have a close affinity with polymer C. Accordingly the resultant composition indicates extremely good moldability to provide a very gloss product. In fact, however, application of said grafting process alone has been found insufficient to impart high impact strength to molded articles. The present inventors' further study on this point shows that resin compositions can not be furnished with high compact strength, unless the graftpolymer B obtained in Step II is uniformly dispersed in the hard brittle polymer C in larger particles than 150 millimicrons on the average. Where the graftpolymer B has a particle size exceeding 1,000 millimicrons, then the molded product will decrease in gloss. Therefore the particle size of the graftpolymer B should fall within the range of 150 to 1000 millimicrons, or preferably 200 to 800 millimicrons. In this case, said particle size need not always be uniform. Where, however, the particle size has an ununiform distribution, it is necessary that the respective particles should only differ in size by less than one micron.

The rubbery copolymer A used in the method of this invention should include 0.5 to 25 parts by weight of an acrylic or methacrylic ester of THF, MOE or MOB or a mixture thereof.

The ester of alkyl acrylate (where the alkyl group has 2 to 8 carbon atoms) constituting the other component of the rubbery copolymer A may include other copolymerizable monomers such as styrene, acrylonitrile, vinyl ethers and esters of alkyl methacrylate such as methyl methacrylate and 2-ethylhexyl methacrylate, insofar as the glass transition temperature (abbreviated as Tg) of the rubbery copolymer A does not exceed −10°C. Where said glass transition temperature increases over −10°C, then the resultant resin composition will noticeably decrease in impact strength at a lower temperature than 0°C. Accordingly, the Tg should be lower than −10°C or preferably −30°C. Further, if required, it is possible to add 1 percent or less of polyfunctional compounds capable of cross linking such as divinyl benzene and dimethacrylate.

Dispersion of the graftpolymer B in the polymer C in particle sizes of 150 to 1,000 millimicrons can be practically carried out by bringing the original copolymer A to a latex form having the prescribed particle sizes of 150 to 1,000 millimicrons by emulsion polymerization. Formation of a latex copolymer having such large particle size can be effected by the customary process of making a condensed rubbery latex of polybutadiene series.

The graftpolymer B is prepared by graftpolymerizing 100 parts by weight (in solid form) of the latex copolymer A with 100 to 300 parts by weight of at least one compound selected from the group consisting of aromatic vinyl compounds, vinyl cyanides and mixtures of either of said both types of compounds and monomers copolymerizable therewith by means of radical polymerization in the presence of 0 to 0.5 part by weight of a chain transfer reagent. In this case, addition of less than 100 parts by weight of said mixtures of either of the aforesaid both types of compounds and monomers copolymerizable therewith is not sufficient to impart desired properties to a final resin composition. An optimum addition of said mixture ranges between 120 and 200 parts by weight. Further, addition of a chain transfer reagent consisting of alkyl mercaptans such as tert-pauryl mercaptan is chosen to be to 0 to 0.5 part by weight, but preferred to fall within the range of 0 to 0.3 part by weight. It is practically advantageous to carry out graftpolymerization by emulsion polymerization.

A compound grafted to the rubbery copolymer A is preferred to be at least one compound selected from the group consisting of 20 to 100 percent by weight of aromatic vinyl compounds, 40 to 0 percent by weight of vinyl cyanides or 0 to 70 percent by weight of mixtures of either of said both types of compounds and monomers, for example, methyl methacrylate copolymerizable therewith.

A group of aromatic vinyl compounds used in graftpolymerization includes styrene, α-methyl styrene and chlorostyrene, and another group of vinyl cyanides used in said copolymerization includes acrylonitrile and methacrylonitrile. The graftpolymer B obtained in Step II which is compatible with the hard brittle polymer C should preferably be blended with said polymer C in sufficient proportions to effect full compatibility therewith. Said polymer C may consist of the same type of aromatic vinyl compounds or vinyl cyanides as those used in preparing said graftpolymer B.

The graftpolymer B may be directly blended with the polymer C which consists of, for example, PS emulsion, AS emulsion or an emulsion of α-methyl styrenestyreneacrylonitrile copolymer. The blended mass may later be solidified with addition of inorganic salting out reagents. Or it is possible first to coagulate the graft copolymer B with addition of a proper reagent and then blend said copolymer B thus coagulated with the separately prepared polymer C on a roll or by an extruder. Where required, additives such as a stabilizer and pigment may be incorporated in the mass in carrying out said blending.

A thermoplastic resin composition prepared by the abovementioned method of this invention displays very prominent weatherability, impact strength and moldability and is adapted for application in wide fields and, particularly due to excellent weatherability, most suitable as electrical or mechanical parts used in a state exposed to various environmental conditions.

This invention will be more fully understood by reference to the examples and controls which follow.

EXAMPLE 1

1 In an autoclave with an agitator were charged 450g of butyl acrylate, 50g of THF, 2.5g of an emulsifier (manufactured by Kao Soap Company under a trademark "Emal No. 0"), 0.1g of potassium persulfate as a polymerization catalyst and 200g of water. The air in the autoclave was fully replaced by nitrogen gas and polymerization was carried out at 50°C. When the conversion reached to 40 percent, 300g of water was further added. Later the polymerization attained a degree of 98 percent in 6 hours and the average latex particle size was 350 millimicrons. When observed by an electronic microscope, said latex consisted of particles whose sizes widely extended over a range of 150 to 900 millimicrons.

2. 200g of said latex copolymer, 1g of Emal No. 0 and 0.3g of potassium persulfate were introduced into an autoclave with an agitator having the air therein previously replaced by nitrogen gas. Further, 600g of water was added. A mixture of 140g of styrene, 60g of acrylonitrile and 0.2g of tert-lauryl mercaptan was added continuously in two hours at 60°C so as to obtain 30 percent concentration of solids upon completion of graftpolymerization. The latex was coagulated by the addition of 2,000g of 10 percent $CaCl_2$ aq. and the mixture was heated to 90°C. It was filtered and washed repeatedly with water and dried at 60°C.

3. There was separately prepared by suspension polymerization AS resin containing 30 percent acrylonitrile and having a total molecular weight of 100,000. The AS resin was blended on the roll at 170°C with the powdered graftpolymer so that the rubbery component derived from said powdered graftpolymer amounted to 25 percent of the whole composition. When tested for the physical properties, the composition indicated a very large Izod impact value of 35 kg.cm/cm (as measured according to the American Standards for Testing Materials (abbreviated as ASTM)-D256).

Control

This experiment represents a control carried out for comparison with Example 1. An autoclave with an agitator having the contained air replaced by nitrogen gas was charged with 450g of butyl acrylate, 50g of THF, 15g of Emal No. 0, 0.1g potassium persulfate and 1,000g of water. Polymerization was continued for 6 hours at 50°C. A latex graftpolymer obtained had a particle size of 80 millimicrons. When said latex graftpolymer was further treated in the same manner as in Example 1, the product indicated an Izod impact value of 2.5 kg.cm/cm, proving that the product had its properties noticeably affected by such a small size as 80 millicrons

EXAMPLE 2

Polymerization was carried out in the same manner as in Example 1, excepting that the rubbery latex copolymer obtained in Step I of Example 1 consisted of components having the proportions given in Table 1 below, in which the unit is part by weight. Treatments of Steps II and III were conducted in the same manner as in Example 1. A resin composition obtained showed the properties whose measured values are given in Table 2.

Table 1

| Sample No. | MOE | MOB | THF | Butyl acrylate | 2-ethyl-hexyl acrylate | Styrene | Acrylo-nitrile | 2-ethylene hexyl methacrylate |
|---|---|---|---|---|---|---|---|---|
| 1 | — | — | 1 | 99 | — | — | — | — |
| 2 | — | — | 5 | 95 | — | — | — | — |
| 3 | — | — | 5 | 80 | — | — | — | 15 |
| 4 | 5 | — | — | 95 | — | — | — | — |
| 5 | 20 | — | — | 80 | — | — | — | — |
| 6 | 10 | — | — | 50 | 40 | — | — | — |
| 7 | 5 | — | 5 | 75 | 10 | — | 5 | — |
| 8 | — | 1 | — | 69 | 20 | — | 10 | — |
| 9 | — | 15 | — | 40 | 10 | 10 | — | 25 |
| 10* | — | — | — | 100 | — | — | — | — |
| 11* | — | — | — | 50 | 50 | — | — | — |
| 12* | — | — | — | 80 | 10 | — | 10 | — |

*controls

Table 2

| Sample No. | Impact strength kg.cm/cm (1) | Tensile strength at yield point kg/mm$^2$ (2) | Elongation at break point % (2) | Melt.index g/10 min. (3) |
|---|---|---|---|---|
| 1 | 40 | 3.8 | 40 | 13 |
| 2 | 35 | 4.0 | 35 | 15 |
| 3 | 32 | 4.0 | 35 | 12 |
| 4 | 38 | 3.9 | 35 | 15 |
| 5 | 36 | 3.9 | 38 | 14 |
| 6 | 36 | 4.1 | 37 | 14 |
| 7 | 35 | 4.1 | 35 | 15 |
| 8 | 35 | 4.1 | 35 | 13 |
| 9 | 35 | 4.1 | 35 | 14 |
| 10* | 5.0 | 3.2 | 20 | 3 |
| 11* | 4.3 | 3.1 | 20 | 3 |
| 12* | 4.6 | 3.2 | 20 | 3 |

1) ASTM-D256
2) ASTM-D638
3) ASTM-D1238, excepting that the load was 5 kg and the temperature was 250°C
*controls Moldings obtained from Samples 1 to 9 presented a good appearance and gloss, whereas moldings derived from Samples 10 to 12 were less lustrous and, when annealed, contracted themselves as much as to lose their original forms, and, further as seen from Table 2, prominently decreased in impact strength and other mechanical properties.

"WE-2") at 50°C and without pouring water over the tester, the results being presented in Table 4.

As apparent from Table 4, the resin compositions of this invention indicated far more excellent weatherability than said ABS commercially known as "Denka ABS-GR 3,000."

Table 4

| Sample No. | Impact strength kg.cm/cm | | | |
|---|---|---|---|---|
| | After exposure of zero hr | After exposure of 100 hrs | After exposure of 300 hrs | After exposure of 800 hrs |
| 2 | 35 | 34 | 35 | 30 |
| 4 | 38 | 38 | 35 | 36 |
| 5 | 36 | 35 | 32 | 33 |
| 7 | 35 | 34 | 30 | 32 |
| 9 | 35 | 32 | 30 | 31 |
| Commercially available ABS | 33 | 27 | 20 | 10 |

Note: The commercially available ABS was manufactured by Denki Kagaku Kogyo Kabushiki Kaisha under a trademark "Denka ABS GR-3000".

EXAMPLE 3

Resin compositions listed in Table 3 below were prepared in the same manner as in Example 1, excepting that the initial rubbery copolymer had the same composition as Sample 4 of Example 2 and the amounts of compounds being grafted and that of tart-lauryl mercaptan were changed. The impact strength of the resin compositions obtained was measured, the results being given in Table 3 in which the unit is part by weight.

EXAMPLE 5

There were prepared by the customary process a latex of polybutylacrylate concentrated at 30 percent and having an average particle size of 100 millimicrons and a latex copolymer formed of butyl acrylate-5 percent THF and concentrated to the same extent as the first mentioned latex and consisting of particles whosle size similarly indicated 100 millimicrons on the average.

Table 3

| Sample No. | Rubbery copolymer | Grafted compounds | | | tert-lauryl mercaptan | Impact strength kg.cm/cm |
|---|---|---|---|---|---|---|
| | | Styrene | Acrylo-Nitrile | Methacry-late | | |
| 13 | 100 | 70 | 30 | 0 | 0 | 31 |
| 14 | do. | do. | do. | 0 | 0.2 | 29 |
| 15 | do. | 140 | 60 | 0 | 0 | 35 |
| 16 | do. | do. | do. | 0 | 0.4 | 30 |
| 17 | do. | 210 | 90 | 0 | 0 | 36 |
| 18 | do. | do. | do. | 0 | 0.3 | 34 |
| 19 | do. | do. | do. | 0 | 0.5 | 30 |
| 20 | do. | 60 | 0 | 90 | 0.1 | 30 |
| 21 | do. | 40 | 30 | 70 | 0.1 | 31 |
| 22* | do. | 35 | 15 | 0 | 0 | 6 |
| 23* | do. | 56 | 24 | 0 | 0 | 4 |
| 24* | do. | 140 | 60 | 0 | 0.6 | 5 |
| 25* | do. | 210 | 90 | 0 | 0.6 | 5 |

*controls

The above Table 3 clearly shows that Samples 13 to 21 according to this invention displayed for higher impact strength than Samples 22 to 25 falling outside of the invention.

EXAMPLE 4

Samples 2, 4, 5, 7 and 9 of Example 2 were tested for weatherability by irradiating carbon arcs thereon using an instrument of weathering test (manufactured by Toyo Rika Kogyo Kabushiki Kaisha under a trademark 300g of each latex was mixed with 200g of water, 1g of sodium dodecylbenzene sulfonate and 0.3g of potassium persulfate. While the mixture was stirred in atmosphere of nitrogen gas, 90g of styrene monomer was added in small proportions to complete copolymerization. The mixture of graftpolymer and styrene homopolymer obtained was separated into the respective components by fractionation using methylethyl-ketonmethyl alcohol. The results are shown in Table 5.

Table 5

| Type of latex | Graft-polymer (%) | Homopolymer (%) | Graft efficiency of polystyrene (%) |
| --- | --- | --- | --- |
| Copolymer of 95% BUTYL ACRYLATE AND 5% THF | 81 | 19 | 62 |
| *Polybutylacrylate | 53 | 47 | 6 |

Note: *control

Table 5 shows that while grafted styrene was only 6% in the case of polybutylacrylate, it was 62 percent in the case of the rubbery copolymer of this invention though said copolymer contained only 5% THF, providing that even if only 5 percent THF is used as one of the ingredients of the rubbery copolymer, graft efficiency is prominently elevated on account of numerous active points on THF. The graft efficiency was determined as follows:

Each latex was used in an amount of 300g, at 30% concentration and in a state containing 90g of solids. 90g of styrene was used as a graft monomer. Therefore, the rubbery copolymer and the styrene monomer respectively amounted to 50 percent of the mass used in said determination.

Graft Efficiency = (81−50/50) × 100 = 62 percent (this invention)

Graft Efficiency = (53−50/50) × 100 = 6 percent (control)

What we claim is:

1. Thermoplastic resin compositions prepared by the steps of copolymerizing 0.5 to 25 parts by weight of at least one compound selected from the group consisting of acrylic and methacrylic esters of ethylene glycol monomethyl ether with 99.5 to 75 parts by weight of monomers consisting of alkyl acrylate wherein the alkyl group has 2 to 8 carbon atoms to obtain a rubbery copolymer A; graftpolymerizing 100 parts by weight of said rubbery copolymer A with 100 to 300 parts by weight of at least one compound selected from the group consisting of aromatic vinyl compounds, vinyl cyanides and mixtures of either of said both types of compounds and monomers copolymerizable therewith in the presence of 0 to 0.5 parts by weight of a chain transfer reagent to obtain a graftpolymer B; and blending said graftpolymer B with a polymer C separately prepared from at least one compound consisting of aromatic vinyl compounds, vinyl cyanides and mixtures thereof so as to cause said graftpolymer B to be uniformly dispersed in particle sizes of 150 to 1000 millimicrons in said polymer C.

2. Resin compositions according to claim 1 wherein the vinyl monomers partly constituting the rubbery copolymer A are prepared by incorporating in the alkyl acrylate at least one compound selected from the group consisting of styrene, acrylonitrile, vinyl ethers and methacrylic esters, insofar as the glass transition temperature of said rubbery copolymer A does not exceed −10°C.

3. Resin compositions according to claim 1 wherein the aromatic vinyl compound is at least one compound selected from the group consisting of styrene, α-methyl styrene and chlorostyrene, and vinyl cyanide is at least one compound selected from the group consisting of acrylonitrile and methacrylonitrile.

4. Resin compositions according to claim 1 wherein one of the monomers copolymerizable with either of the aromatic vinyl compounds and vinyl cyanides is a methacrylic ester.

5. Resin compositions according to claim 4 wherein the methacrylic ester is methyl methacrylate.

6. Resin compositions according to claim 1 wherein said compound graftpolymerized with the rubbery copolymer A is 20 to 100 percent by weight of aromatic vinyl compounds, 40 to 0 percent by weight of vinyl cyanides and 0 to 70 percent by weight of mixtures of either of said both types of compounds and monomers copolymerizable therewith.

* * * * *